US 9,471,778 B1

(12) United States Patent
Seo et al.

(10) Patent No.: US 9,471,778 B1
(45) Date of Patent: Oct. 18, 2016

(54) AUTOMATIC BASELINING OF ANOMALOUS EVENT ACTIVITY IN TIME SERIES DATA

(71) Applicant: International Business Machines Corporation, Armonk, NY (US)

(72) Inventors: Hyun Kyu Seo, Austin, TX (US); Ronald B. Williams, Austin, TX (US); Gideon Zenz, Kassel (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/953,742

(22) Filed: Nov. 30, 2015

(51) Int. Cl.
*H04L 29/00* (2006.01)
*G06F 21/55* (2013.01)
*H04L 29/06* (2006.01)
*G06F 11/34* (2006.01)
*H04L 12/801* (2013.01)

(52) U.S. Cl.
CPC ............. *G06F 21/552* (2013.01); *G06F 11/34* (2013.01); *H04L 47/29* (2013.01); *H04L 63/1425* (2013.01); *G06F 2221/034* (2013.01)

(58) Field of Classification Search
CPC .... H04L 63/1425; H04L 47/29; G06F 11/34; G06F 21/552; G06F 2221/034
See application file for complete search history.

(56) References Cited

U.S. PATENT DOCUMENTS

| 6,195,590 | B1 | 2/2001 | Powell | |
| 7,533,188 | B1* | 5/2009 | Greger | G06F 9/4881 709/220 |
| 7,733,776 | B1* | 6/2010 | Lee | H04L 41/0816 370/230.1 |
| 7,889,666 | B1* | 2/2011 | Pei | H04L 41/065 370/242 |
| 7,984,222 | B2 | 7/2011 | Gower et al. | |
| 8,341,106 | B1* | 12/2012 | Scolnicov | G06N 7/005 702/50 |
| 8,457,928 | B2 | 6/2013 | Dang et al. | |
| 8,516,104 | B1* | 8/2013 | Liu | H04L 43/16 379/133 |
| 8,959,633 | B1* | 2/2015 | Dokey | G06F 21/50 705/30 |
| 9,047,465 | B2 | 6/2015 | Qiu et al. | |
| 2005/0111328 | A1* | 5/2005 | Potyrailo | B01L 3/502715 369/53.25 |
| 2006/0037077 | A1* | 2/2006 | Gadde | H04L 63/168 726/23 |
| 2007/0192040 | A1 | 8/2007 | Woo et al. | |
| 2007/0257782 | A1 | 11/2007 | Etcheson | |
| 2008/0084295 | A1* | 4/2008 | Libby | G08B 26/007 340/539.22 |
| 2009/0296629 | A1* | 12/2009 | Lincoln | H04B 7/18589 370/321 |
| 2010/0027432 | A1* | 2/2010 | Gopalan | H04L 41/142 370/252 |
| 2010/0097945 | A1* | 4/2010 | Raftelis | H04L 63/1441 370/252 |
| 2010/0122120 | A1* | 5/2010 | Lin | G06F 11/076 714/47.3 |
| 2011/0238376 | A1* | 9/2011 | Dang | G06F 11/3409 702/186 |
| 2014/0029530 | A1* | 1/2014 | Kim | H04W 48/02 370/329 |
| 2014/0244563 | A1* | 8/2014 | Atomori | G06F 11/008 706/46 |
| 2015/0033086 | A1* | 1/2015 | Sasturkar | G06F 11/0709 714/57 |
| 2015/0120914 | A1* | 4/2015 | Wada | H04L 43/04 709/224 |
| 2016/0092516 | A1* | 3/2016 | Poola | G06F 17/30377 707/776 |

OTHER PUBLICATIONS

"Binomial distribution", From Wikipedia, the free encyclopedia,last modified on Nov. 18, 2015, at 18:16, Printed on: Nov. 19, 2015 4:31 PM, 11 pages.

* cited by examiner

*Primary Examiner* — Michael Pyzocha
(74) *Attorney, Agent, or Firm* — William H. Hartwell

(57) ABSTRACT

Software that automatically creates baselines from time series data of computer system activity, thereby providing immediate value from observed system data. The software performs the following operations: (i) receiving values of one or more attributes of a computing system that correspond to one or more time periods; (ii) determining a first set of statistical thresholds for the received values, wherein the received values include a subset of values that exceed the first set of statistical thresholds; (iii) determining a second set of statistical thresholds for the subset of values that exceed the first set of statistical thresholds; and (iv) determining a baseline pattern for the one or more attributes based, at least in part, on the determined first set of statistical thresholds and the determined second set of statistical thresholds.

17 Claims, 7 Drawing Sheets

AUTOMATIC BASELINING OF ANOMALOUS EVENT ACTIVITY IN TIME SERIES DATA

BACKGROUND

The present invention relates generally to the field of systems management, and more particularly to detecting statistical anomalies in time series data relating to similar time and activity periods.

Systems management is known. Generally speaking, systems management includes the administration and management of computer systems. Some examples of common systems management tasks include, but are not limited to: performance management, storage management, capacity monitoring, security management (including anti-virus and anti-malware management), hardware inventory, software inventory, software installation, network utilization, and user activity monitoring.

Performance monitoring (also sometimes referred to as "performance management") is a known system management task that generally involves monitoring systems to help predict, detect, and/or diagnose problems. One way in which performance monitoring sub-systems monitor systems is by observing various system metrics (or "attributes") over a period of time, where the data points (or "values") for these metrics over time are commonly referred to as "time series data". A known sub-task of performance monitoring is event detection, which involves detecting anomalous activity within given time series data.

SUMMARY

According to an aspect of the present invention, there is a method, computer program product and/or system that performs the following operations (not necessarily in the following order): (i) receiving values of one or more attributes of a computing system, wherein the values of the one or more attributes correspond to one or more time periods; (ii) determining a first set of statistical thresholds for the received values of the one or more attributes, wherein the received values of the one or more attributes include a subset of values that exceed the first set of statistical thresholds for the received values of the one or more attributes; (iii) determining a second set of statistical thresholds for the subset of values that exceed the first set of statistical thresholds for the received values of the one or more attributes; and (iv) determining a baseline pattern for the one or more attributes based, at least in part, on the determined first set of statistical thresholds for the received values of the one or more attributes and the determined second set of statistical thresholds for the subset of values that exceed the first set of statistical thresholds for the received values of the one or more attributes.

DETAILED DESCRIPTION

Figure 1:
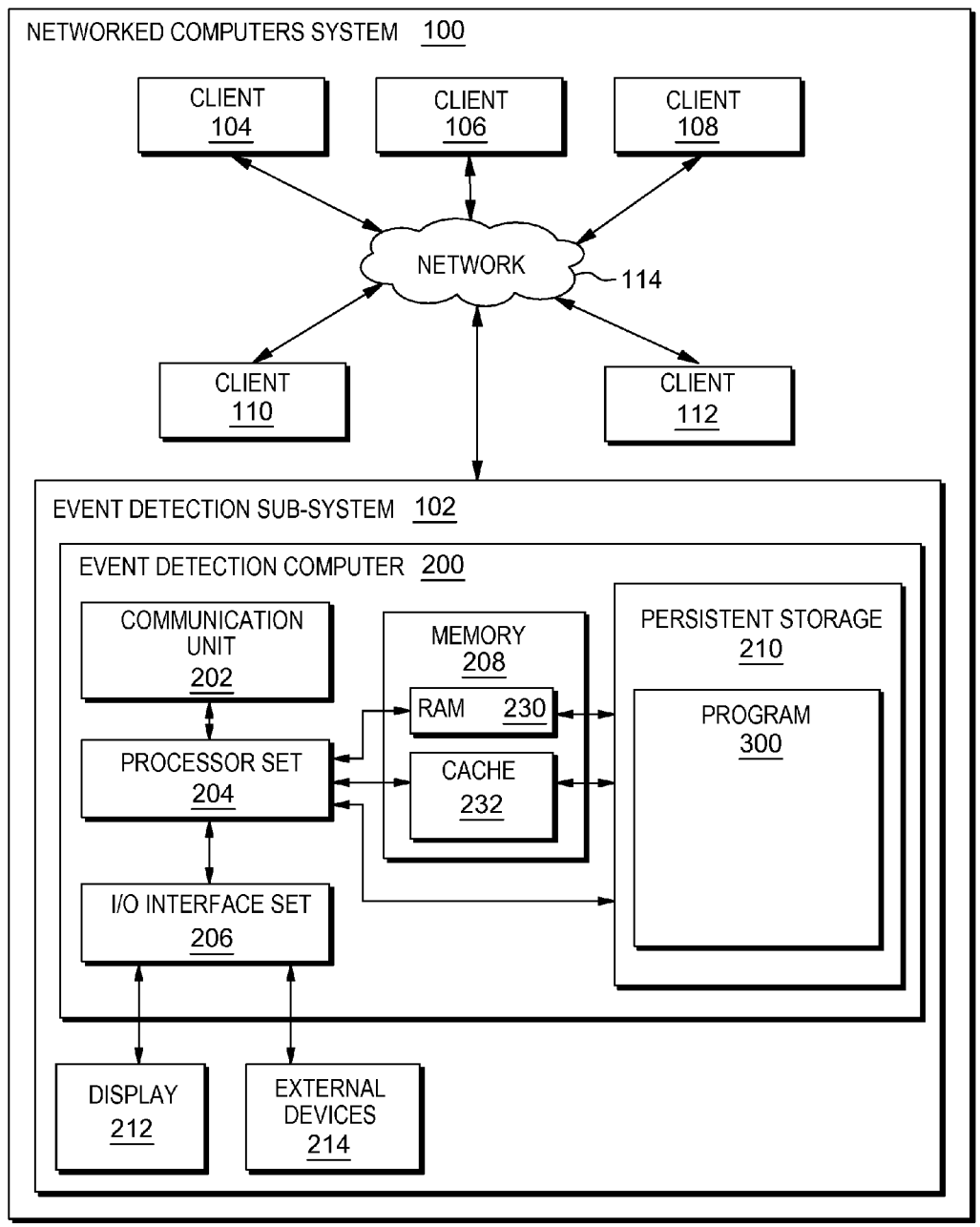
FIG. 1 is a block diagram view of an embodiment of a system according to the present invention.

In order for computer systems (such as performance monitoring systems and/or event detection systems) to properly detect anomalous activity, they need to have a baseline of activity that serves as template for "normal" system activity. However, known baselines are generated either by using generic rules or by manual user input. Embodiments of the present invention automatically create baselines from time series data of system activity, thereby providing immediate value from observed system data. In this way, as will be discussed in detail below, embodiments of the present invention can detect anomalous event activity without requiring prior input from a human user. This Detailed Description section is divided into the following sub-sections: (i) The Hardware and Software Environment; (ii) Example Embodiment; (iii) Further Comments and/or Embodiments; and (iv) Definitions.

I. THE HARDWARE AND SOFTWARE ENVIRONMENT

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of networked computers system 100, including: event detection sub-system 102; client sub-systems 104, 106, 108, 110, 112; communication network 114; event detection computer 200; communication unit 202; processor set 204; input/output (I/O) interface set 206; memory device 208; persistent storage device 210; display device 212; external device set 214; random access memory (RAM) devices 230; cache memory device 232; and program 300.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage and control certain software functions that will be discussed in detail, below, in the Example Embodiment sub-section of this Detailed Description section.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. EXAMPLE EMBODIMENT

Figure 2:
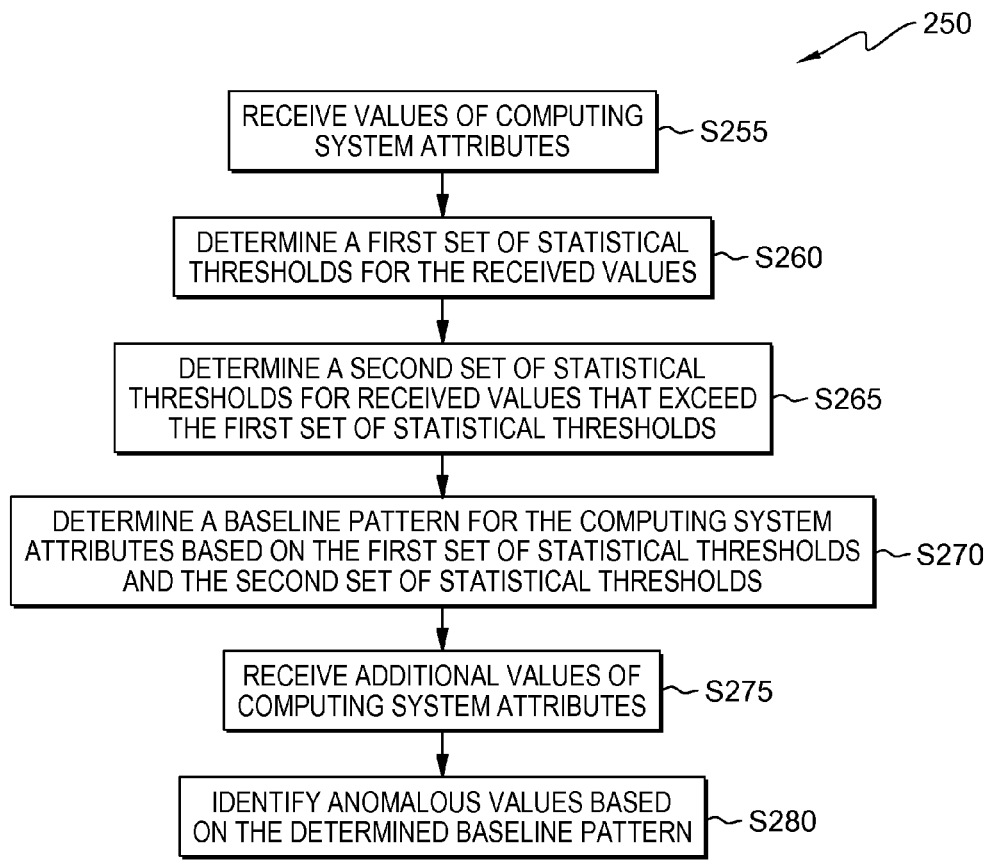
FIG. 2 is a flowchart showing a method performed, at least in part, by the system of FIG. 1.
Figure 3:
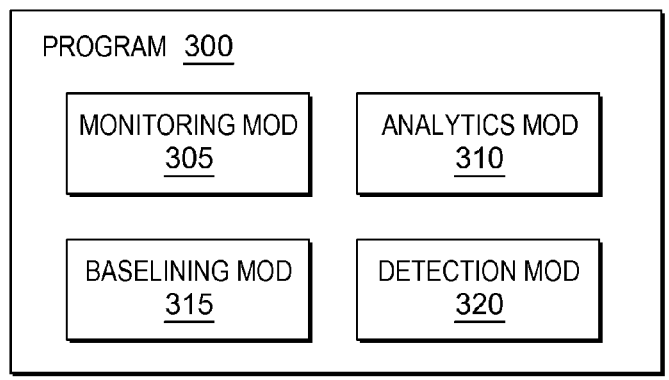
FIG. 3 is a block diagram showing a machine logic (for example, software) portion of the system of FIG. 1.

FIG. 2 shows flowchart 250 depicting a method according to the present invention. FIG. 3 shows program 300 for performing at least some of the method operations of flowchart 250. This method and associated software will now be discussed, over the course of the following paragraphs, with extensive reference to FIG. 2 (for the method operation blocks) and FIG. 3 (for the software blocks). It should be noted that this example embodiment (also referred to in this sub-section as the "present embodiment," the "present example," the "present example embodiment," and the like) is used herein for example purposes, in order to help depict the scope of the present invention. As such, other embodiments (such as embodiments discussed in the Further Comments and/or Embodiments sub-section, below) may be configured in different ways or refer to other features, advantages, and/or characteristics not fully discussed in this sub-section.

In the present embodiment, client sub-systems 104, 106, 108, 110, and 112 are devices that are capable of interacting with event detection sub-system 102 over network 114 to deliver values (or "data") of various attributes of networked computers system 100. The attributes (also referred to as "metrics") may relate to a wide variety computing system functions, such as network traffic, network performance, activity of users of networked computers system 100, operating parameters of various sub-systems (such as sub-systems 104, 106, 108, 110, 112), and the like. However, these examples are not meant to be limiting, and the attributes of networked computers system 110 may comprise any computing system attributes known (or yet to be known) in the art.

In this embodiment, event detection sub-system 102 and event detection computer 200 are adapted to detect anomalous activity in computing system attribute data. Anomalous activity can sometimes take the form of "events", which are collections of received data that correspond to periods of time and hold some level of significance to a user (or other entity) that is monitoring the computing system. An anomalous event is one which differs from normal activity in some statistically significant way, while a non-anomalous event is one which is generally considered to be normal. For example, while a non-anomalous event may indicate a planned system maintenance period, an anomalous event may indicate that there has been an intrusion into the computing system by an unknown and/or unpermitted party.

In order to properly detect anomalous activity, computer systems need to have a baseline of activity that serves as template for "normal" system activity. As will be discussed over the following paragraphs, the method of the present embodiment operates to automatically create a baseline of system activity from known system attribute data. In this way, the present embodiment can detect anomalous activity without requiring prior input from a human user.

Processing begins at operation S255 (see FIG. 2), where monitoring module ("mod") 305 (see FIG. 3) receives values of computing system attributes corresponding to one or more time periods. As previously stated, the received values of attributes may relate to a wide variety of known (or yet to be known) computing system functions, and further, the values may correspond to a wide range of time periods. For an additional discussion of attributes and their values, see the Further Comments and Embodiments sub-section, below.

Figure 4A:
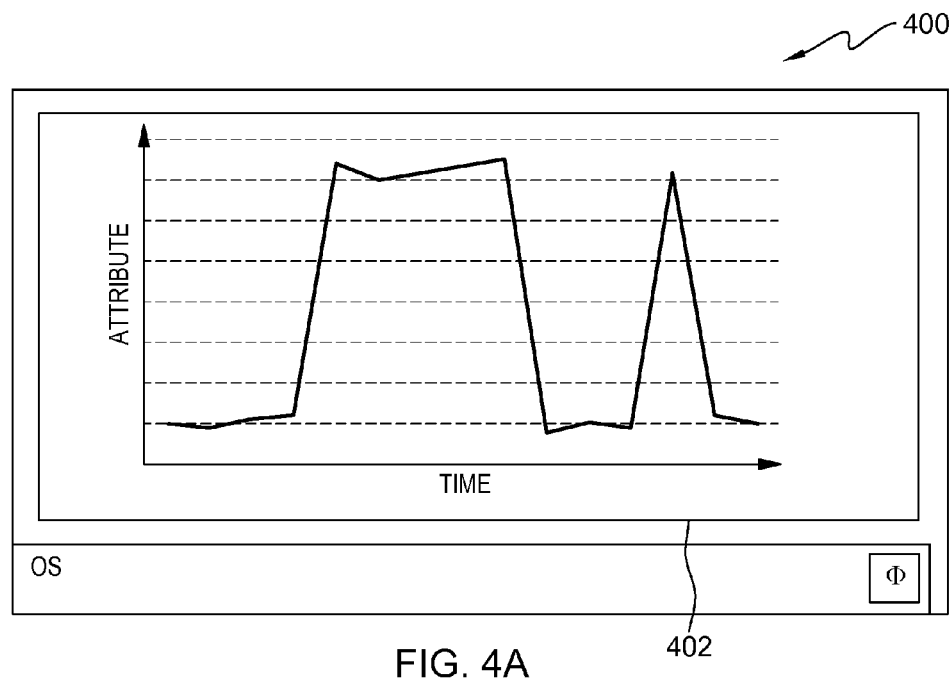
FIGS. 4A-4E are screenshot views generated by the system of FIG. 1.

For illustration purposes, screenshot 400 (see FIG. 4A) depicts an example of sample attribute data received during operation S255. As shown in FIG. 4A, graph 402 is an example visual depiction of the received attribute values over time, where the y-axis represents the attribute values and the x-axis represents time. This basic graph structure will be reproduced throughout the discussion of the present example embodiment in order to depict attribute values and various features thereof (including various statistical thresholds, to be discussed below). Screenshot 400 (and additional screenshots discussed below) is an example of a screenshot that may be shown to a user of event detection computer 200 who is monitoring networked computers system 100 for potentially anomalous activity.

Processing proceeds to operation S260, where analytics mod 310 determines a first set of statistical thresholds for the received values of computing system attributes. The first set of statistical thresholds may be determined in a wide variety of ways and may include a wide variety of known (or yet to be known) thresholding calculations. For example, in certain embodiments (including some discussed below in the Further Comments and/or Embodiments sub-section), the statistical thresholds are based on a two standard deviation envelope. Some other examples of ways to determine statistical thresholds include, but are not limited to: (i) regression analysis models; (ii) nonlinear autoregressive models; (iii) stochastic models; (iv) integrated models; (v) moving average models; (vi) k-nearest neighbors algorithms; (vii) support vector machines; (viii) clustering methods; and/or (ix) any other outlier detection techniques.

Figure 4B:
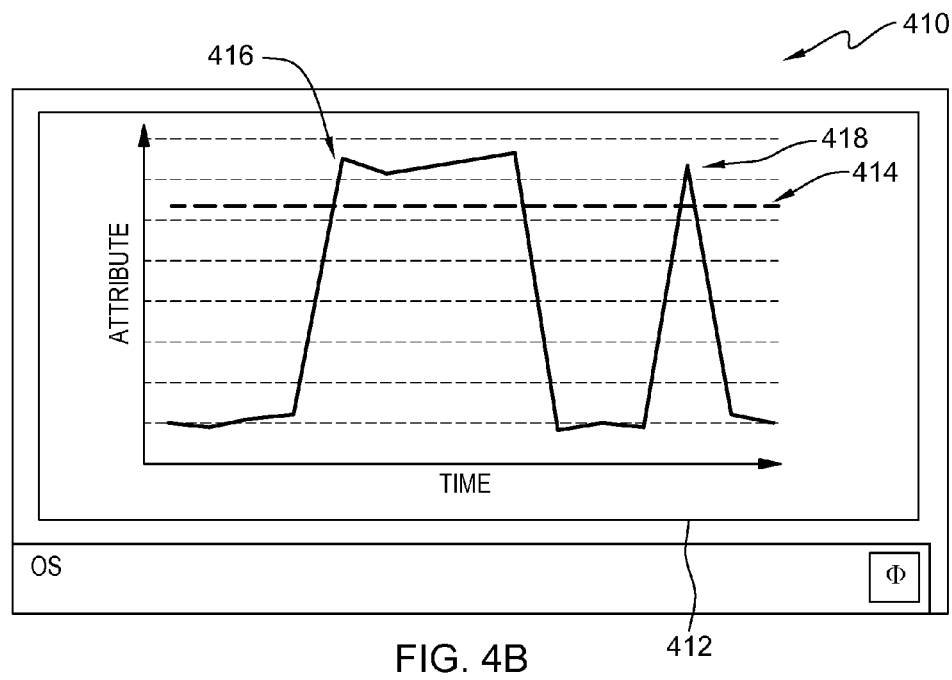

In the present example embodiment, although a majority of the received attribute values fall below the determined first set of statistical thresholds, there are a subset of received attribute values that exceed the thresholds. This concept is illustrated in screenshot 410 (see FIG. 4B), where graph 412 includes the same example attribute values as graph 402, but with an addition of statistical threshold 414. The attribute values that exceed statistical threshold 414 include outlier set 416 and outlier set 418. These outlier sets represent attribute values that would potentially be considered anomalous when compared to the received attribute values as a whole.

Figure 4C:
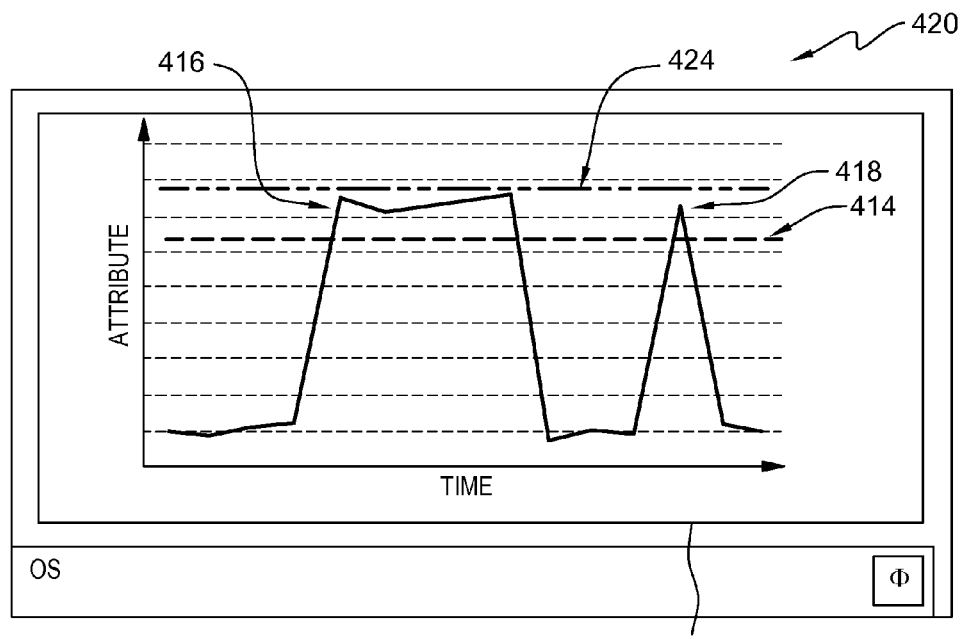

Processing proceeds to operation S265, where analytics mod 310 determines a second set of statistical thresholds for the received values that exceed the first set of statistical thresholds. In other words, referring again to FIG. 4B, in this operation, analytics mod 310 determines statistical thresholds for the attributes values that exceed statistical threshold 414—namely, outlier set 416 and outlier set 418. In this way, analytics mod 310 creates thresholds that will identify when attribute values are outside the range of known outliers, which make those attribute values much more likely to represent anomalous events. As with the first set of statistical thresholds, the second set of statistical thresholds may be determined in a wide variety of ways and may include a wide variety of known (or yet to be known) thresholding calculations, including the previously mentioned two standard deviation envelope. Graph 422 of screenshot 420 (see FIG. 4C) shows an example of a second statistical threshold as applied to the data previously shown in graph 402 and graph 412. As shown in FIG. 4C, statistical threshold 424, which is a threshold that has been applied to the values of outlier set 416 and outlier set 418, is higher than the previously determined statistical threshold 414 as it is a threshold for the subset of outliers as opposed to a threshold for the entire set of received attribute values.

In some cases, outlier attribute values—that is, attribute values that exceed the first set of statistical thresholds—may correspond to such a short period of time that analytics mod 310 determines not to consider them in calculating the second set of statistical thresholds. For example, in certain embodiments, prior to determining the second set of statistical thresholds, analytics mod 310 determines whether any subset of the values that exceed the first set of statistical thresholds correspond to a time period that is shorter than a predetermined burst period. If so, that subset is filtered out of the values that are considered to exceed the first set of statistical thresholds. An example of such a subset is outlier set 418 (see FIGS. 4B and 4C). Because outlier set 418 represents a relatively short period of time (especially when compared to outlier set 416), analytics mod 310 determines that the values in outlier set 418 are unlikely to represent a significant event affecting networked computers system 100. As such, analytics mod 310 removes outlier set 418's values from the calculation of the second set of statistical thresholds in order to strengthen the threshold's ability to accurately detect outlier activity in the future. For a further discussion of burst periods, see the Further Comments and/or Embodiments sub-section of this Detailed Description.

Processing proceeds to operation 5270, where baselining mod 315 determines a baseline pattern for the computing system attributes based on the first set of statistical thresholds and the second set of statistical thresholds. Although the baseline pattern (or simply, "baseline") may ultimately be determined in a wide variety of ways that utilize the two sets of statistical thresholds (a number of which are discussed below in the Further Comments and/or Embodiments subsection of this Detailed Description), a simplified baseline according to the present example embodiment is shown in screenshot 430 (see FIG. 4D). As shown in graph 432 of screenshot 430, in this embodiment, the baseline (baseline pattern 434) comprises a combination of the first set of statistical thresholds and the second set of statistical thresholds, such that the first set of statistical thresholds applies for most time periods, and that the second set of statistical thresholds applies during the time period corresponding to outlier set 416. In this way, baselining mod 315 creates a baseline that incorporates standard statistical thresholds as well as thresholds on known outliers, thereby creating a more accurate representation of normal system behavior.

Figure 4D:
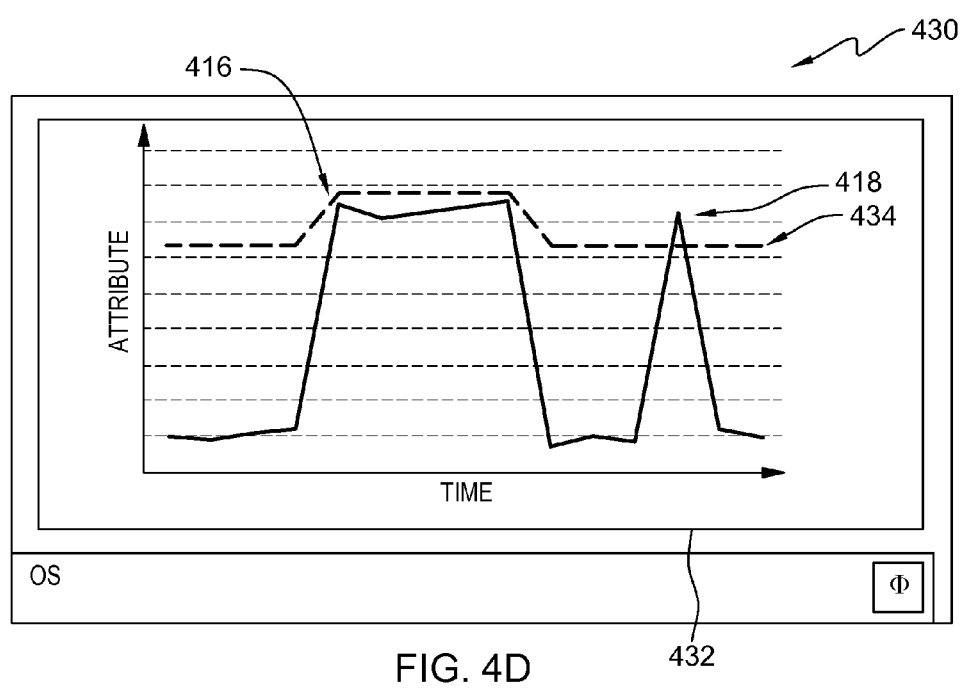

It should be noted that in FIG. 4D, outlier set 418 is shown to exceed baseline pattern 434. This is due to the fact that analytics mod 310 chose to filter out outlier set 418's values in operation S265 for corresponding to a period of time shorter than the burst period. In other words, because outlier set 418 corresponds to a short burst period, its data is not included in calculating the baseline pattern.

Once a baseline pattern has been determined, the baseline can then be used to detect anomalous activity in additional attribute data. Processing proceeds to operation 5275, where monitoring mod 305 receives additional values of the computing attributes corresponding to one or more additional time periods. Generally speaking, at least some of the additional values should be for the same attributes as the values received in operation S255. Further, although in many cases the one or more additional time periods will be subsequent to the time periods corresponding to the original attribute values, that is not always the case, and in some situations, the additional time periods will precede the time periods corresponding to the original attribute values.

Figure 4E:
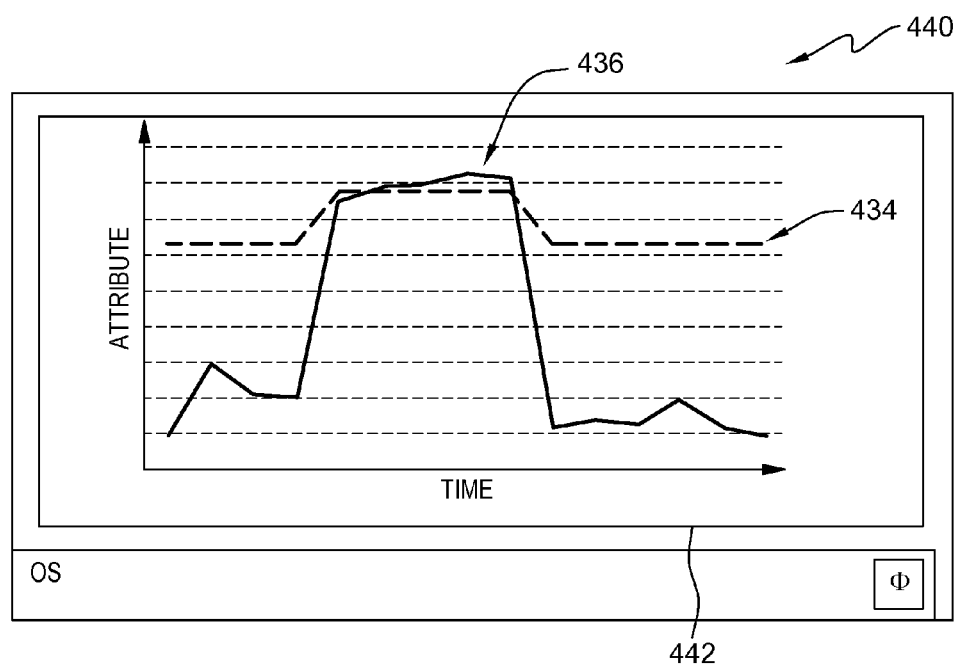

Processing proceeds to operation 5280, where detection mod 320 identifies anomalous values of the additional values based, at least in part, on the determined baseline pattern. The identification and/or detection of anomalous values may take place using a wide variety of known (or yet to be known) methods for detecting anomalous activity using a baseline. Screenshot 440 (see FIG. 4E) depicts an example of such a detection according to the present example embodiment. As shown in FIG. 4E, graph 442 depicts new attribute values (received during operation 5275, above) in relation to baseline pattern 434. As depicted, outlier set 436 is a set of attribute values that exceed the thresholds from the baseline pattern. As such, outlier set 436 is identified as anomalous. In this embodiment, detection mod 320 alerts a user of networked computers system 110 that anomalous values have been identified, providing the user with an opportunity to respond to the alert.

In certain embodiments, the received additional values of computing system attributes are used to enhance and/or modify the determined baseline pattern, thereby improving the ability of the baseline to detect anomalous activity over time. Furthermore, in other (or the same) embodiments, the start time of the additional time periods for which additional attribute values are collected is randomly determined, in order to prevent individuals from utilizing knowledge of baselines to perform malicious activity. Examples of such embodiments are discussed in further detail in the Further Comments and/or Embodiments sub-section, below.

III. FURTHER COMMENTS AND/OR EMBODIMENTS

Some embodiments of the present invention recognize the following facts, potential problems and/or potential areas for improvement with respect to the current state of the art: (i) event analysis in a user specific environment requires development of a baseline of activity before anomaly detection can occur; and (ii) in existing event analysis systems, users either need a set of generic rules or to develop their own set of rules before any value of the system can be realized.

Some embodiments of the present invention may include one, or more, of the following features, characteristics and/or advantages: (i) achieving immediate value from an event analysis system; (ii) achieving value while avoiding significant user tuning and input; (iii) identifying statistically significant time periods (for example, time of day, day of week, week of month) against which to evaluate current system activity; (iv) accommodating periodic short duration high volume events without degrading overall effectiveness; (v) enabling a user to simply and quickly (for example, via a single mouse click) identify and visualize anomalous behavior for any individual event or concurrently related events; and/or (vi) mitigating attempts to evade detection of anomalous events by timing malicious activity based on the timing parameters of a baseline process.

In an embodiment of the present invention, an event is represented by the form "Event: {timestamp: [attr1, attr2, . . . , attrN}, an adjustable observation P, and a statistical sampling period of S". To capture an event, an event detection system calculates counts per time period of each observed attribute value. The system calculates a simple moving average (M), a two standard deviation 'envelope' (where M is a single standard deviation), and identifies periodic 'bursts' exceeding the two standard deviation envelope, including the magnitude and duration of each of the bursts. The system then identifies a minimal statistically significant number of events (MSEP) and uses the MSEP to calculate the mean duration and average period between events, as well as the 2 standard deviations (that is, the mean plus or minus one standard deviation) of both the duration and the period. The system then calculates a moving window of baseline events against which to evaluate current events. This moving window is considered to be an anomaly threshold.

It should be noted that standard deviation is only one statistical technique that may be used to develop thresholds for event activity and/or period and duration of 'burst' activity. Other known (or yet to be known) time series analysis techniques may also be applied.

Figure 5:
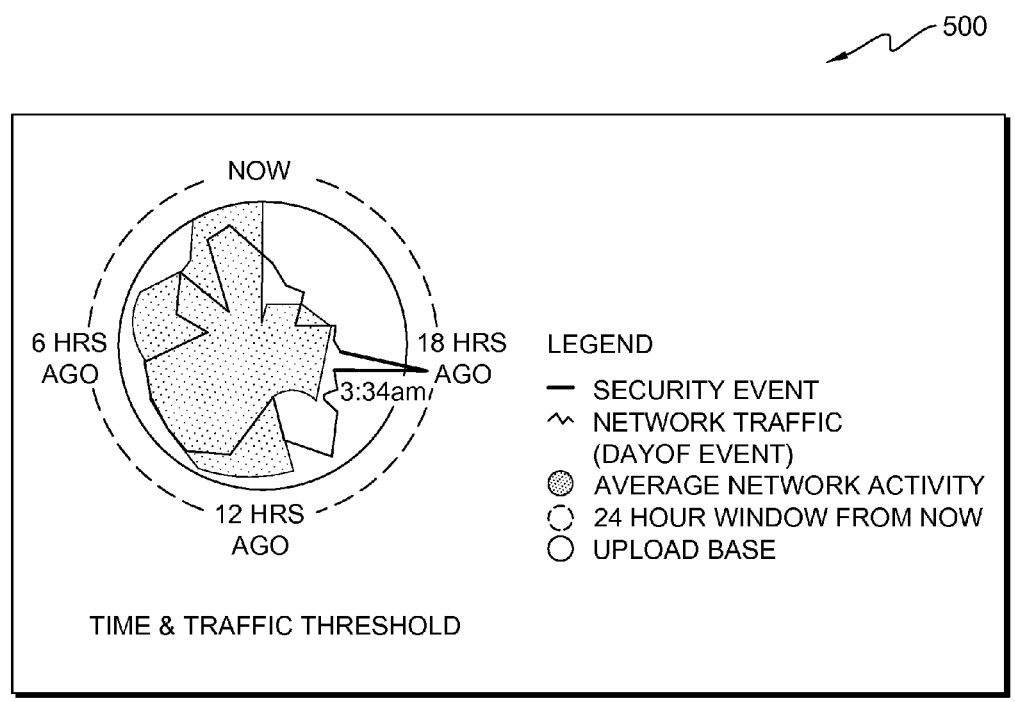
FIG. 5 is a diagram showing a 24-hour view of system attributes, according to an embodiment of the present invention.

Some embodiments of the present invention enable a user to visualize activity by attribute and event attribute relationships, allowing the user to select attributes or sets of attributes. For any particular event type, event detection systems of these embodiments can display the associated event attributes and allow for a selection to display historical, threshold, and current event counts for any individual or any arbitrary selection of attributes. Diagram 500 (see FIG. 5) shows an example of a 24-hour view according to one of these embodiments. As shown in FIG. 5, attribute values (in this case, network traffic) may be represented along with average values (in this case, average network activity) in order to more clearly indicate anomalous activity (in this case, the security event at 3:34 AM).

An underlying design principle of certain event detection systems of the present invention is to, using minimal first order observations, introduce only as much complexity (that is, functionality) needed to achieve demonstrably useful results. Certain embodiments, for example, defer to empirical observations over derivatives, and first order derivatives to subsequent derivatives, following the general rule of "less is more." In some embodiments, enhancements that include additional functionality that yields low proportional gain in useable output are deemed gratuitous.

Some embodiments of the present invention provide a "hands off" event detection system that auto-tunes for optimal detection of anomalous events. Many of these embodiments include two primary components: dynamic baselining and runtime detection.

Figure 6:
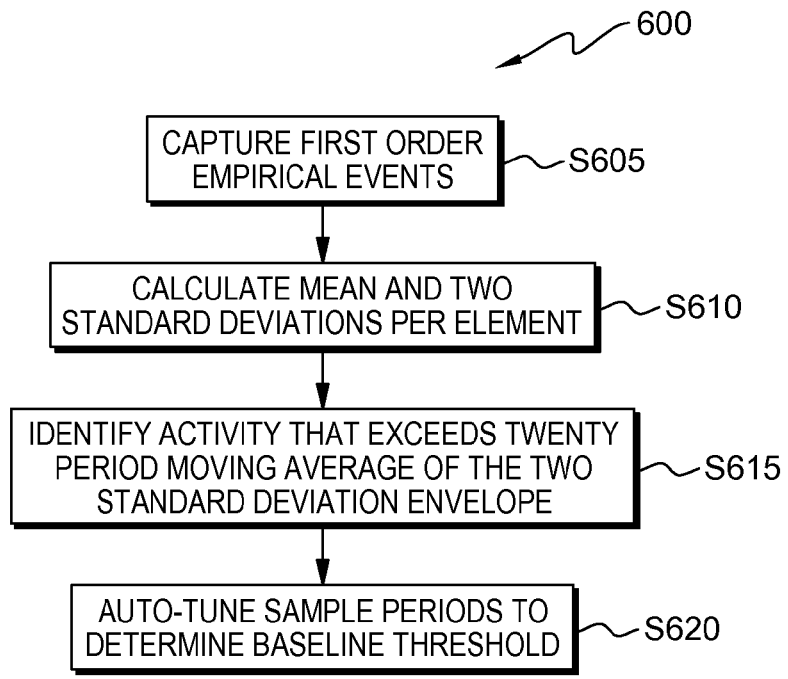
FIG. 6 is a flowchart showing a method performed according to an embodiment of the present invention.

FIG. 6 shows flowchart 600 depicting a method for performing dynamic baselining according to the present invention. Processing begins with operation S605, where an event detection system captures first order empirical events.

Process proceeds to operation S610, where the event detection system calculates the mean and two standard deviation envelope per element per selected sample period.

An element may be, for example, an event, an event attribute, or an individual attribute. The system then uses these calculations to create an initial threshold with which the event detection system may detect future 'above threshold' activity.

Processing proceeds to operation S615, where the event detection system identifies activity in samples that exceed a twenty period moving average of the two standard deviation envelope. In this operation, the event detection system also calculates the mean and two standard deviation period (duration) of the identified activity. The result is a filtering 'discriminator' with which to filter 'normal' behavior which exceeds the threshold determined in operation S610.

Processing proceeds to operation S620, where the event detection system auto-tunes sample periods to achieve a statistically viable calculation. The result is a baseline threshold to be used in runtime detection (discussed below). For any period, baseline thresholds can be calculated for entire events, arbitrary subsets of event attributes, or individual attributes themselves.

In certain embodiments, a goal of auto-tuning the sample periods is to provide enough data to be meaningful while keeping the duration short enough to provide enough time to react properly to anomalous events. The sample period may also be auto-tuned so as to not provide so much data that it results in an unacceptable amount of slowdown to the system. In some cases, "enough data" means that there is at least one activity sample that exceeds a moving average and therefore needs correction. What is considered "enough data", "enough time", and/or an "unacceptable amount of slowdown" may be determined dynamically based on a variety of factors or, in some cases, may be configured manually by a user. In some embodiments, the data may comprise an expected number of events per time period (for example, per day, as shown in FIG. 5). If no events are detected, the sample size can increase (linearly or exponentially, for example) until a maximum is reached. In other embodiments, an optimal window size per time period could be calculated based on historical data. For example, the optimal window size may be shorter during busy time periods (for example, at 3:00 PM) and longer during non-busy time periods (for example, at 3:00 AM). In still other embodiments, auto-tuning methods of the present invention may use time series analysis or pattern mining approaches such as regression analysis, Markov models, or association rule learning.

Figure 7:
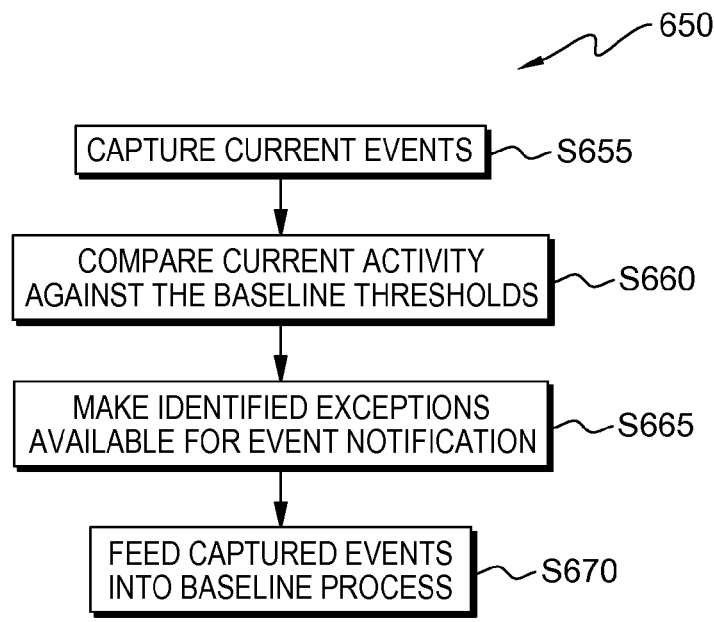
FIG. 7 is a flowchart showing a method performed according to an embodiment of the present invention.

FIG. 7 shows flowchart 650 depicting a method for performing runtime detection according to the present invention. Processing begins with operation S655, where an event detection system captures current events. Processing proceeds to operation S660, where the event detection system compares current activity against the baseline thresholds (generated, for example, according to the method depicted in FIG. 6) to identify exceptions. Processing proceeds to operation S665, where the event detection makes the identified exceptions available for alert triggering, operator notification, or any other form of event notification. Processing then concludes with operation S670, where the captured events are all fed into the baseline process (for example, the process depicted in FIG. 6) for continuous improvement. In this manner, the baseline process is auto-tuned over time, resulting in optimal sample sizes for future event detection.

Certain embodiments of the present invention provide an anti-gaming mechanism for preventing attackers from utilizing knowledge of a performance monitoring system's event detection processes to avoid detection of malicious activity. For example, knowledge of the operational sample period of an event detection system offers attackers the ability to operate within the thresholds. As such, random rotation of the start time of any configured sample period and calculation of relevant sample period thresholds may counter attempts to identify opportunities to 'hide' malicious activity within measured thresholds. If, for example, the system determines the optimal period to be 5 minutes, a naive implementation would compare relevant baseline periods at :00, :05, etc for 12 periods in an hour. However, embodiments that include this anti-gaming mechanism can move forward or backward the comparison period sample calculation to eliminate the expectation of a particular period's behavior.

In many cases, thresholds are based on historical activity. That is, current activity is measured against a threshold specific to the current period of time historically. Assuming continuous event storage of similar time frames, only sufficient second order data (calculated thresholds) need be available for current comparison. Runtime storage can be optimized to provide only as much secondary data (calculated thresholds) as necessary for current period detection. For example, baselining can generally refer to the decomposition of individual events in order to calculate thresholds. Assuming normalized event retention, this means that only as much decomposed data as is required for threshold calculation in the current and subsequent runtime periods needs to be retained. This can be accomplished by processing a moving window of relevant event samples (for example, 20) at least one complete period ahead of the current window. This approach facilitates the anti-gaming mechanism discussed above.

Event detection systems of the present invention may be configured in a wide variety of ways. For example, the following actions may be taken (either alone or in any combination) to configure an event detection system: (i) selecting an arbitrary period for the default time series; (ii) identifying the attributes to capture in a template; (iii) normalizing the attribute values against an attribute schema (that is, a schema that maps for all attributes); (iv) normalizing all dates/times to ISO dates; (v) capturing string data in its original native language (attributes can be globalized, whereas arbitrary string data cannot); (vi) determining not to use un-normalized attributes in the system; (vii) identifying, for each ingestion (both bulk and realtime), the period during which to collect the results (with, for example, a default of five minutes); and/or (viii) collecting enough sample data for any specific period to provide 95% confidence (two standard deviations) in the statistical value of the data.

Some embodiments of the present invention include a recommended time period based on the sample size for the collection time in question, where the recommended time period is auto-tuned in order to achieve a meaningful threshold for future comparisons.

Some embodiments of the present invention ingest event data over a time period to represent at least one representative week of activity. In one embodiment, for example, an optimal baseline period will encompass as much activity as needed to provide meaningful activity envelopes for at least 67% of the attributes in question. Meaningful sample periods may reflect typical weekly activity such as business activity. Some example sample periods include: 24 hours, day of week, work week, 7 day week, week of month, month, month of quarter, quarter, quarter of year, and/or year.

In some embodiments, the amount of "useful precision" for an event detection system should be based on sufficient event flow to provide meaningful thresholds of future expected activity. While more information may seem to be better, in certain cases more information may tend to obscure more than reveal.

In some embodiments of the present invention, event data is parsed and stored by timestamp and selected attributes (for example, {TimeStamp: [attr1, attr2, ..., attrN] }). Event detection systems of these embodiments may identify time periods for which meaningful statistical values may be ascertained (denoted "P(m)") to set a minimum time period observation period. At runtime, event detection systems may select a sliding window of at least P(m) periods in a representative time frame (RTF) (for example, the same hour of the day yesterday, last week, last month, etc.). For each current period, event detection systems may calculate alert thresholds (using, for example, methods discussed above). A query can be then be used to determine whether current activity (for a single attribute or a collection of event related attributes) is within or outside of the calculated threshold. Alternatively, a query can be used to generate tables, graphs, or other visualizations.

Some embodiments, in order to mitigate tampering, enable the observation time period from which event counts are collected to fluctuate (using, for example, a random fluctuation generated by a pseudorandom number generator) from a minimum period of P(m) to a larger arbitrary time period.

Some embodiments enable automatic optimization of time periods to P(m) to enable higher time granularity based on count volumes, and enable query or display of the current system precision based on current activity.

Some embodiments display a list of buttons, identified by attributes, which a user can select, individually or in addition to other event related attributes, in order to visualize current and historical activity against calculated and/or user adjusted thresholds.

Some embodiments include (i) an event parser that captures selected event attributes associated with a timestamp; (ii) a storage system (including but not limited to memory, file system, or database); (iii) a runtime analysis engine to calculate thresholds based on criteria (for example, criteria discussed above) and against which to evaluate current activity; (iv) a query interface to enable programmatic access to current event activity and comparison to arbitrary (user selectable) time periods; and/or (v) a visualization interface (Web, Graphic Client) that enables the user interactions described above.

IV. DEFINITIONS

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

User: includes, but is not necessarily limited to, the following: (i) a single individual human; (ii) an artificial intelligence entity with sufficient intelligence to act as a user; and/or (iii) a group of related users.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method comprising:
receiving values of one or more attributes of a computing system, wherein the values of the one or more attributes correspond to one or more time periods;
determining a first set of statistical thresholds for the received values of the one or more attributes, wherein the received values of the one or more attributes include one or more values that exceed the first set of statistical thresholds for the received values of the one or more attributes;
determining a second set of statistical thresholds for a first subset of values of the received values of the one or more attributes, wherein each value of the first subset exceeds the first set of statistical thresholds for the received values of the one or more attributes;
determining a baseline pattern for the one or more attributes based, at least in part, on the determined first set of statistical thresholds for the received values of the one or more attributes and the determined second set of statistical thresholds for the first subset of values that exceed the first set of statistical thresholds for the received values of the one or more attributes;
utilizing an anti-gaming mechanism for preventing undetected malicious activity on the computing system, wherein the anti-gaming mechanism randomly determines a start time of one or more additional time periods to prevent potential attackers of the computing system from utilizing knowledge of the first set of statistical thresholds, the second set of statistical thresholds, and/or the baseline pattern to avoid detection of malicious activity;
receiving additional values of the one or more attributes of the computing system, wherein the additional values of the one or more attributes correspond to the one or more additional time periods; and
in response to identifying anomalous values in the received additional values based on the determined baseline pattern, sending an alert to a user of the computing system that a potential intrusion in the computing system has occurred.

2. The method of claim 1, further comprising modifying the determined baseline pattern based on the received additional values of the one or more attributes.

3. The method of claim 1, further comprising:
determining a burst period representing a minimum amount of time for which values must exceed the first set of statistical thresholds to be considered statistically significant; and
prior to determining the second set of statistical thresholds for the first subset of values that exceed the first set of statistical thresholds, filtering the first subset of values that exceed the first set of statistical thresholds to remove a second subset of the first subset of values, wherein the values of the second subset correspond to time periods that are shorter than the determined burst period.

4. The method of claim 1, wherein identifying anomalous values is further based on a determination that at least one of the one or more additional time periods is similar to at least one of the one or more time periods.

5. The method of claim 4, wherein the at least one of the one or more additional time periods that is determined to be similar to the at least one of the one or more time periods corresponds to the same time of day as the similar at least one of the one or more time periods, but on a different day.

6. The method of claim 4, further comprising optimizing runtime storage by making the received values of the one or more attributes available for deletion from runtime storage after the determining of the baseline pattern.

7. The method of claim 4, further comprising optimizing runtime storage by making a first set of portions of the determined baseline pattern available for deletion from runtime storage, wherein the portions of the first set correspond to time periods other than the at least one of the one or more additional time periods determined to be similar to the at least one of the one or more time periods.

8. A computer program product comprising a computer readable storage medium having stored thereon:
program instructions programmed to receive values of one or more attributes of a computing system, wherein the values of the one or more attributes correspond to one or more time periods;
program instructions programmed to determine a first set of statistical thresholds for the received values of the one or more attributes, wherein the received values of the one or more attributes include one or more values that exceed the first set of statistical thresholds for the received values of the one or more attributes;
program instructions programmed to determine a second set of statistical thresholds for a first subset of values of the received values of the one or more attributes, wherein each value of the first subset exceeds the first set of statistical thresholds for the received values of the one or more attributes;
program instructions programmed to determine a baseline pattern for the one or more attributes based, at least in part, on the determined first set of statistical thresholds for the received values of the one or more attributes and the determined second set of statistical thresholds for the first subset of values that exceed the first set of statistical thresholds for the received values of the one or more attributes;
program instructions programmed to utilize an anti-gaming mechanism for preventing undetected malicious activity on the computing system, wherein the anti-gaming mechanism randomly determines a start time of one or more additional time periods to prevent potential attackers of the computing system from utilizing knowledge of the first set of statistical thresholds, the second set of statistical thresholds, and/or the baseline pattern to avoid detection of malicious activity;
program instructions programmed to receive additional values of the one or more attributes of the computing system, wherein the additional values of the one or more attributes correspond to the one or more additional time periods; and
program instructions programmed to, in response to identifying anomalous values in the received additional values based on the determined baseline pattern, send an alert to a user of the computing system that a potential intrusion in the computing system has occurred.

9. The computer program product of claim 8, further comprising program instructions programmed to modify the determined baseline pattern based on the received additional values of the one or more attributes.

10. The computer program product of claim 8, further comprising:
program instructions programmed to determine a burst period representing a minimum amount of time for which values must exceed the first set of statistical thresholds to be considered statistically significant; and
program instructions programmed to, prior to determining the second set of statistical thresholds for the first subset of values that exceed the first set of statistical thresholds, filter the first subset of values that exceed the first set of statistical thresholds to remove a second subset of the first subset of values, wherein the values of the second subset correspond to time periods that are shorter than the determined burst period.

11. The computer program product of claim 8, wherein identifying anomalous values is further based on a determination that at least one of the one or more additional time periods is similar to at least one of the one or more time periods.

12. The computer program product of claim 11, further comprising program instructions programmed to optimize runtime storage by making a first set of portions of the determined baseline pattern available for deletion from runtime storage, wherein the portions of the first set correspond to time periods other than the at least one of the one or more additional time periods determined to be similar to the at least one of the one or more time periods.

13. A computer system comprising:
a processor(s) set; and
a computer readable storage medium;
wherein:
the processor set is structured, located, connected and/or programmed to run program instructions stored on the computer readable storage medium; and
the program instructions include:
program instructions programmed to receive values of one or more attributes of a computing system, wherein the values of the one or more attributes correspond to one or more time periods;
program instructions programmed to determine a first set of statistical thresholds for the received values of the one or more attributes, wherein the received values of the one or more attributes include one or more values that exceed the first set of statistical thresholds for the received values of the one or more attributes;
program instructions programmed to determine a second set of statistical thresholds for a first subset of values of the received values of the one or more attributes, wherein each value of the first subset exceeds the first set of statistical thresholds for the received values of the one or more attributes;

program instructions programmed to determine a baseline pattern for the one or more attributes based, at least in part, on the determined first set of statistical thresholds for the received values of the one or more attributes and the determined second set of statistical thresholds for the first subset of values that exceed the first set of statistical thresholds for the received values of the one or more attributes;

program instructions programmed to utilize an anti-gaming mechanism for preventing undetected malicious activity on the computing system, wherein the anti-gaming mechanism randomly determines a start time of one or more additional time periods to prevent potential attackers of the computing system from utilizing knowledge of the first set of statistical thresholds, the second set of statistical thresholds, and/or the baseline pattern to avoid detection of malicious activity;

program instructions programmed to receive additional values of the one or more attributes of the computing system, wherein the additional values of the one or more attributes correspond to the one or more additional time periods; and program instructions programmed to, in response to identifying anomalous values in the received additional values based on the determined baseline pattern, send an alert to a user of the computing system that a potential intrusion in the computing system has occurred.

14. The computer system of claim 13, wherein the program instructions further include program instructions programmed to modify the determined baseline pattern based on the received additional values of the one or more attributes.

15. The computer system of claim 13, wherein the program instructions further include:

program instructions programmed to determine a burst period representing a minimum amount of time for which values must exceed the first set of statistical thresholds to be considered statistically significant; and program instructions programmed to, prior to determining the second set of statistical thresholds for the first subset of values that exceed the first set of statistical thresholds, filter the first subset of values that exceed the first set of statistical thresholds to remove a second subset of the first subset of values, wherein the values of the second subset correspond to time periods that are shorter than the determined burst period.

16. The computer system of claim 13, wherein identifying anomalous values is further based on a determination that at least one of the one or more additional time periods is similar to at least one of the one or more time periods.

17. The computer system of claim 16, further comprising program instructions programmed to optimize runtime storage by making a first set of portions of the determined baseline pattern available for deletion from runtime storage, wherein the first set of portions of the determined baseline pattern correspond to time periods other than the at least one of the one or more additional time periods determined to be similar to the at least one of the one or more time periods.

* * * * *